(12) United States Patent
Winker et al.

(10) Patent No.: US 9,203,513 B2
(45) Date of Patent: Dec. 1, 2015

(54) SNR ENHANCEMENT IN MODULATING RETROREFLECTOR OPTICAL COMMUNICATION LINKS

(75) Inventors: Bruce K. Winker, Ventura, CA (US); Bing Wen, Camarillo, CA (US); Jian Ma, Thousand Oaks, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 883 days.

(21) Appl. No.: 12/121,626

(22) Filed: May 15, 2008

(65) Prior Publication Data

US 2009/0285583 A1    Nov. 19, 2009

(51) Int. Cl.
*H04B 10/00*   (2013.01)
*H04B 10/112*  (2013.01)
*H04B 10/2587* (2013.01)

(52) U.S. Cl.
CPC ........ *H04B 10/1125* (2013.01); *H04B 10/2587* (2013.01)

(58) Field of Classification Search
USPC .................................................. 398/169–170
See application file for complete search history.

(56) References Cited

U.S. PATENT DOCUMENTS

| | | | | |
|---|---|---|---|---|
| 3,584,220 A * | 6/1971 | Nomura et al. | ................ | 398/168 |
| 3,601,491 A * | 8/1971 | Smith-Vaniz | ................ | 356/28.5 |
| 3,863,064 A * | 1/1975 | Doyle et al. | .................... | 398/170 |
| 4,064,434 A * | 12/1977 | Waksberg | ...................... | 398/170 |
| 4,114,151 A * | 9/1978 | Denne et al. | ..................... | 342/44 |
| 4,134,008 A * | 1/1979 | de Corlieu et al. | ........... | 398/170 |
| 4,688,934 A * | 8/1987 | Clark | ............................. | 356/34 |
| 4,731,879 A * | 3/1988 | Sepp et al. | ..................... | 398/170 |
| 4,763,361 A * | 8/1988 | Honeycutt et al. | ............ | 398/108 |
| 4,879,763 A * | 11/1989 | Wood | ............................. | 398/168 |
| 4,882,771 A * | 11/1989 | Rocks | ............................ | 398/168 |
| 5,090,795 A * | 2/1992 | O'Meara et al. | ............... | 359/240 |
| 5,307,195 A * | 4/1994 | Nicole | ........................... | 398/168 |
| 5,369,662 A * | 11/1994 | Storm | ............................. | 372/99 |
| 5,539,565 A * | 7/1996 | Waddoups et al. | ........... | 398/170 |
| 5,546,184 A * | 8/1996 | Downs | .......................... | 356/496 |
| 5,828,057 A * | 10/1998 | Hertzman et al. | ............ | 250/225 |
| 5,923,425 A * | 7/1999 | Dewa et al. | .................... | 356/520 |
| 5,991,036 A * | 11/1999 | Frankel | ......................... | 356/364 |
| 6,017,125 A * | 1/2000 | Vann | ............................. | 359/529 |
| 6,208,424 B1 * | 3/2001 | de Groot | ....................... | 356/500 |
| 6,452,682 B2 * | 9/2002 | Hill et al. | ...................... | 356/493 |
| 6,493,123 B1 * | 12/2002 | Mansell et al. | ............... | 398/169 |

(Continued)

OTHER PUBLICATIONS

McGraw-Hill Dictionary of Scientific and Technical Terms, Sixth Edition: Quarter-Wave Plate, p. 1719, 2003.

(Continued)

*Primary Examiner* — Agustin Bello
(74) *Attorney, Agent, or Firm* — Snell & Wilmer LLP

(57) ABSTRACT

An optical communication system may include a light transmission unit transmitting a light beam having a first polarization, a quarter waveplate to receive the light beam and to modify the light beam to have a second polarization, and a retroreflector to receive the light beam from the quarter waveplate and reflect the light beam to the quarter waveplate, which modifies the light beam to have a third polarization. The optical communication system may also include a half waveplate to modify the first polarization such that the first polarization is about 90 degrees rotated compared to the third polarization, and a polarizer to pass the light beam having the third polarization and to block most of the light beam having the first polarization.

11 Claims, 3 Drawing Sheets

(56) References Cited

U.S. PATENT DOCUMENTS

| | | | |
|---|---|---|---|
| 6,624,916 B1* | 9/2003 | Green et al. | 398/169 |
| 6,765,724 B1* | 7/2004 | Kramer | 359/566 |
| 6,795,243 B1 | 9/2004 | McGettigan et al. | |
| 6,811,272 B2 | 11/2004 | O'Connor et al. | |
| 6,825,960 B2* | 11/2004 | Curtis et al. | 359/35 |
| 6,851,812 B2 | 2/2005 | Newell et al. | |
| 6,857,747 B2 | 2/2005 | Pentico et al. | |
| 6,893,130 B2 | 5/2005 | Pentico et al. | |
| 6,899,432 B2 | 5/2005 | Pentico et al. | |
| 6,945,654 B2 | 9/2005 | Newell et al. | |
| 6,962,424 B2 | 11/2005 | O'Connor et al. | |
| 6,971,747 B2 | 12/2005 | Newell et al. | |
| 7,018,058 B2 | 3/2006 | O'Connor et al. | |
| 7,039,261 B2* | 5/2006 | Fu et al. | 385/11 |
| 7,104,650 B2 | 9/2006 | Pentico et al. | |
| 7,108,374 B2 | 9/2006 | Pentico et al. | |
| 7,110,623 B1* | 9/2006 | Kalibjian | 385/11 |
| 7,212,347 B2 | 5/2007 | Pentico et al. | |
| 7,224,905 B2* | 5/2007 | Ruggiero | 398/170 |
| 7,233,606 B2* | 6/2007 | Varshneya et al. | 372/6 |
| 7,252,399 B2 | 8/2007 | Ferri et al. | |
| 7,254,288 B2* | 8/2007 | Kalibjian | 385/11 |
| 7,317,876 B1* | 1/2008 | Elliott | 398/170 |
| 7,347,561 B2 | 3/2008 | Pentico et al. | |
| 7,360,703 B2* | 4/2008 | McIntyre et al. | 235/454 |
| 7,463,828 B2* | 12/2008 | Moon et al. | 398/87 |
| 7,603,041 B2* | 10/2009 | Varshneya et al. | 398/170 |
| 7,627,251 B2* | 12/2009 | Walther et al. | 398/118 |
| 7,679,805 B2* | 3/2010 | Dadkhah et al. | 359/248 |
| 7,800,758 B1* | 9/2010 | Bridges et al. | 356/482 |
| 7,813,040 B2* | 10/2010 | Colbourne et al. | 359/495 |
| 7,859,675 B2* | 12/2010 | Maryfield et al. | 356/445 |
| 2009/0245788 A1* | 10/2009 | Varshneya et al. | 398/33 |
| 2009/0279903 A1* | 11/2009 | Roes et al. | 398/214 |
| 2009/0285583 A1* | 11/2009 | Winker et al. | 398/152 |

OTHER PUBLICATIONS

Yariv et al.; "Optical Waves in Crystals"; Chapter 5, pp. 121-127, 2003.

Wikipedia: WavePlate; website: http://en.wikipedia/org/wiki/Quarter-wave_plate; accessed Mar. 24, 2011; 2 pages.

Wiktionary: Quarter-Wave Plate; website; http://en./wikitionary.org/wiki/quarter-wave_plate; accessed Mar. 24, 2011; 1 page.

Department of Physics and Astronomy, Georgia State University; Quarter-Wave Plate; website: http://hyperphysics.phy-astr.gsu.edu/hbase/phyopt/quarwv.html; accessed Apr. 10, 2011; 2 pages.

* cited by examiner

SNR ENHANCEMENT IN MODULATING RETROREFLECTOR OPTICAL COMMUNICATION LINKS

BACKGROUND

1. Field

The invention relates generally to communication devices and systems. More specifically, the invention relates to increasing the signal-to-noise ratio (SNR) in retroreflector optical communication devices and systems over long distances.

2. Related Art

A prior art optical communication system may have a light source, a modulating retro-reflector and a detector. For optical communications, the light source emits light at a certain wavelength towards the modulating retro-reflector, which reflects the light back to the detector. One drawback of the prior art optical communication system is that the area (e.g., background) surrounding the modulating retro-reflector reflects the light producing stray light (i.e., noise) to the detector. Furthermore, the detector can receive other forms of noise such as background reflections and ambient solar radiation. The noise affects the signal-to-noise ratio (SNR), which is important in order to allow the detector to accurately and efficiently receive the information transmitted from the retroreflector. Thus, a need exists in the art for an improved optical communication system and related method.

SUMMARY

An optical communication system may include a light transmission unit transmitting a light beam having a first polarization, a quarter waveplate to receive the light beam and to modify the light beam to have a second polarization, and a retroreflector to receive the light beam from the quarter waveplate and reflect the light beam to the quarter waveplate, which modifies the light beam to have a third polarization. The optical communication system may also include a polarizer to pass all or most of the light beam having the third polarization and to block all or most of the light beam having the first polarization.

An optical communication system may include a light transmission unit transmitting a light beam having a first circular polarization, a quarter waveplate to receive the light beam and to modify the light beam to have a linear polarization, a retroreflector to receive the light beam from the quarter waveplate and reflect the light beam through the quarter waveplate, which modifies the light beam to have the first circular polarization, and a polarizer to pass all or most of the light beam having the first circular polarization and to block all or most of the light beam having a second circular polarization (e.g., light reflected or scattered from the background).

A method for optical communication comprising transmitting a polarized laser beam with a first polarization from a first communication apparatus to a second communication apparatus, the first communication apparatus being at a distance (e.g., at least 1 meter) away from the second communication apparatus. The method may comprise changing the first polarization of the polarized laser beam to a second polarization at the second communication apparatus, reflecting the polarized laser beam to the first communication apparatus, and blocking or attenuating light having the first polarization that is reflected from the background while transmitting the polarized laser beam having the second polarization to a detector in the first communication apparatus.

BRIEF DESCRIPTION OF THE DRAWINGS

The features, objects, and advantages of the invention will become more apparent from the detailed description set forth below when taken in conjunction with the drawings, wherein.

DETAILED DESCRIPTION

Apparatus, systems and methods that implement the embodiments of the various features of the invention will now be described with reference to the drawings. The drawings and the associated descriptions are provided to illustrate some embodiments of the invention and not to limit the scope of the invention. Throughout the drawings, reference numbers are re-used to indicate correspondence between referenced elements. In addition, the first digit of each reference number indicates the figure in which the element first appears. The term "light," "light beam" and "laser beam" may be used interchangeably throughout the disclosure.

Figure 1:
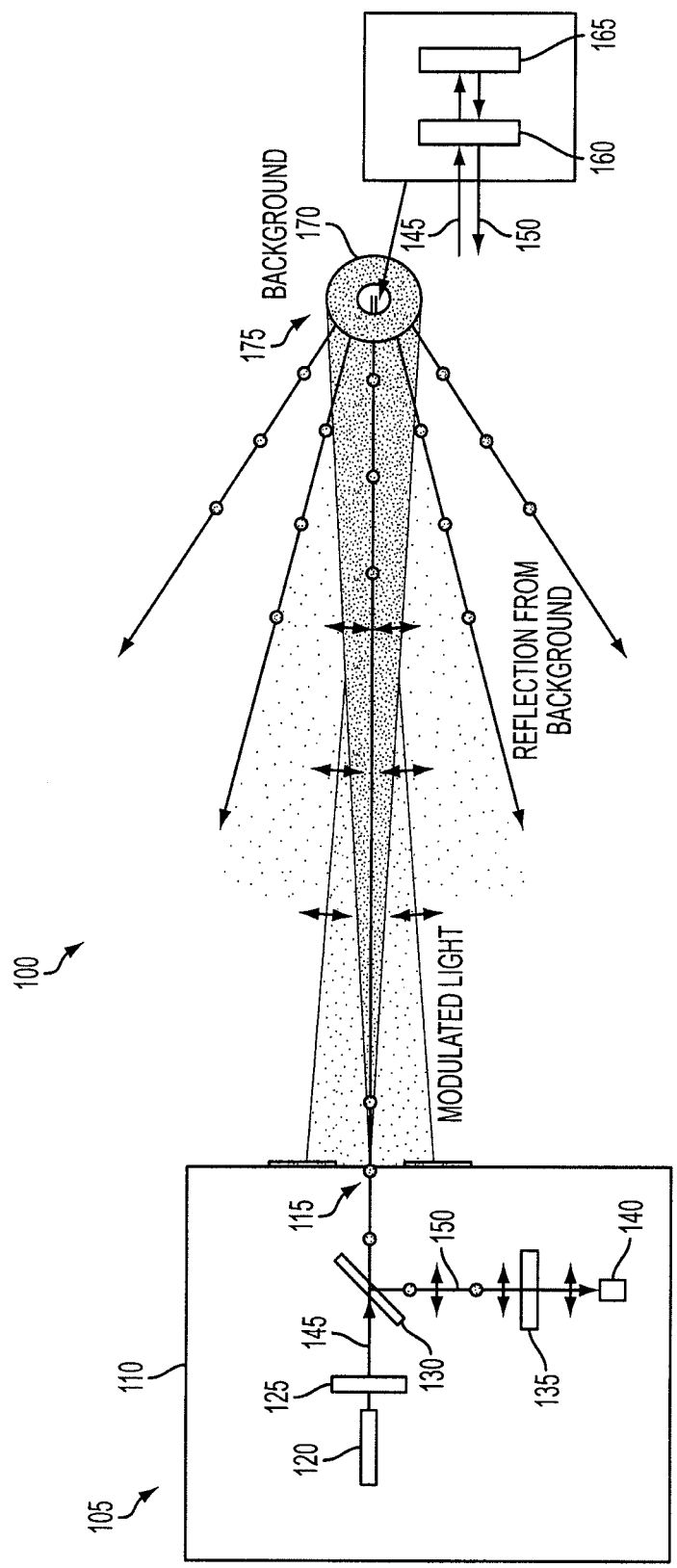
FIG. 1 is a block diagram of an optical communication system according to an embodiment of the invention.

FIG. 1 is a block diagram of an optical communication system 100 according to an embodiment of the invention. The optical communication system 100 may include an interrogator 105 and a reflector apparatus 175. The interrogator 105 may include a housing 110 having an opening 115, a light source 120, a waveplate 125, a beamsplitter 130, a polarizer 135, and a detector 140. The light source 120, the waveplate 125, the beamsplitter 130, the polarizer 135, and the detector 140 are positioned within the housing 110. The reflector apparatus 175 may include a waveplate 160, and a modulating retro-reflector (MRR) 165 (also referred to as a Dynamic Optical Tag (DOT)).

The interrogator 105 may be a hand-held device or may be part of a larger device. In one embodiment, the interrogator 105 is about 10 centimeters by 10 centimeters in size. The interrogator 105 may be located a distance (e.g., at least 1 meter and preferably greater than 1 kilometer) away from the reflector apparatus 175 (block 405).

The light source 120 may be a laser transmission unit that emits a light beam 145 (e.g., a laser beam) having a first polarization and a specific wavelength, for example, at 850 nanometers or 1550 nanometers (block 405). The first polarization can be a linear polarization or a circular polarization (e.g., left or right hand circular polarization). In one embodiment, the first polarization has 0 degree polarization. The light source 120 can emit the light beam 145 a distance of up to about 1 and 10 meters. A battery or generator can be used to provide power to the light source 120. The battery or generator may be positioned within the housing 110.

The waveplate 125 may be a half waveplate that is used to change or rotate the polarization of the light beam from the light source 120. The half waveplate can be a tunable liquid crystal retarder that rotates the polarization of the light beam with a control voltage. The half waveplate can be a fixed optical phase retarder that rotates the polarization of the light beam with the rotation (e.g., mechanical or electrical rotation) of the waveplate about its normal axis. The waveplate 125 may be positioned between the light source 120 and the beamsplitter 130 or may be positioned between the beamsplitter 130 and the opening 115. In one embodiment, the waveplate 125 may be removed from the interrogator 105.

The beamsplitter 130 may be configured to pass light beams with a first polarization and reflect light beams with a second polarization. For example, light beams 145 traveling from the light source 120 are passed through the beamsplitter 130 toward the reflector apparatus 175. Light beams 150 traveling from the reflector apparatus 175 are reflected off the beamsplitter 130 toward the polarizer 135.

The light beams 145 emitted from the light source 120 exit the housing 110 through the opening 115. The light beams 145 have a first polarization and travel to the reflector apparatus 175. The reflector apparatus 175 includes the waveplate 160 and the MRR 165. The waveplate 160 may be a quarter waveplate that is used to change or rotate the polarization of the light beam from the interrogator 105 (block 410). The MRR 165 receives the light beam and modulates and/or reflects the light beam back through the quarter waveplate 160 and ultimately back to the interrogator 105 (block 415). The light beam 150 exiting the waveplate 160 has passed through the waveplate 160 twice. If the light beam 145 entering the waveplate 160 is polarized 45 degrees towards the optical axis of the waveplate 160, the light beam 150 has a polarization rotated 90 degrees compared to the incoming light beam 145. The polarization of the light beam 145 is rotated by the waveplate 125 to produce the light beam 150 with a second polarization that is nominally perpendicular to the polarization of the light beam 145 so the detector 140 can detect mostly light beams 150 having the second polarization (block 410).

The background area 170 surrounding the waveplate 160 may also reflect the light beam 145 back toward the interrogator 105. The background area 170 causes reflections of the light beams 145 (i.e., noise) that produce inaccurate readings at the detector 140. Most of the reflected light will have the same polarization as the light beams 145.

The light beams 150 and the reflected light travel back to the beamsplitter 130 through the opening 115. The beamsplitter 130 reflects portions of the light beams 150 and the reflected light toward the polarizer 135. The polarizer 135 allows the significant portions of the light beams 150 to pass through and blocks or attenuates significant portions of the reflected light from the background (block 420). That is, the polarizer 135 passes significant portions of the light beams having the second polarization and blocks or attenuates significant portions of the light beams having the first polarization. Hence, the detector 140 detects mostly the light beams having the second polarization but only very small portions of the light beams having the first polarization.

Figure 2:
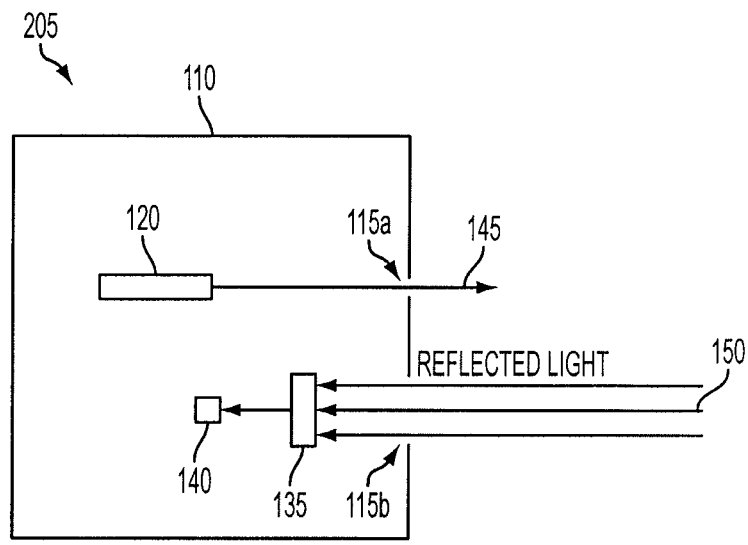
FIG. 2 is a block diagram of an interrogator according to an embodiment of the invention.

FIG. 2 is a block diagram of an interrogator 205 according to an embodiment of the invention. The housing 110 has a first opening 115a and a second opening 115b. The light source 120 emits the light beam 145 having a first polarization toward the reflector apparatus 175. The reflector apparatus 175 modifies the polarization of the light beam 145 to produce the light beam 150 having a second polarization. The light beam 150 is transmitted to the polarizer 135 through the second opening 115b. The polarizer 135 allows the light beams 150 to pass through and significantly reduces the amount of the light reflected from the background from reaching the detector 140.

Figure 3:
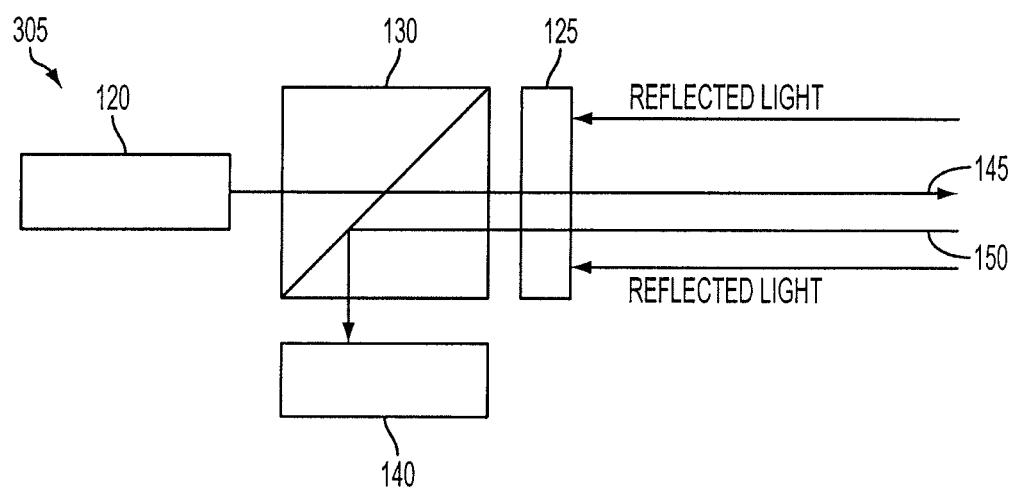
FIG. 3 is a block diagram of an interrogator according to an embodiment of the invention.
Figure 4:
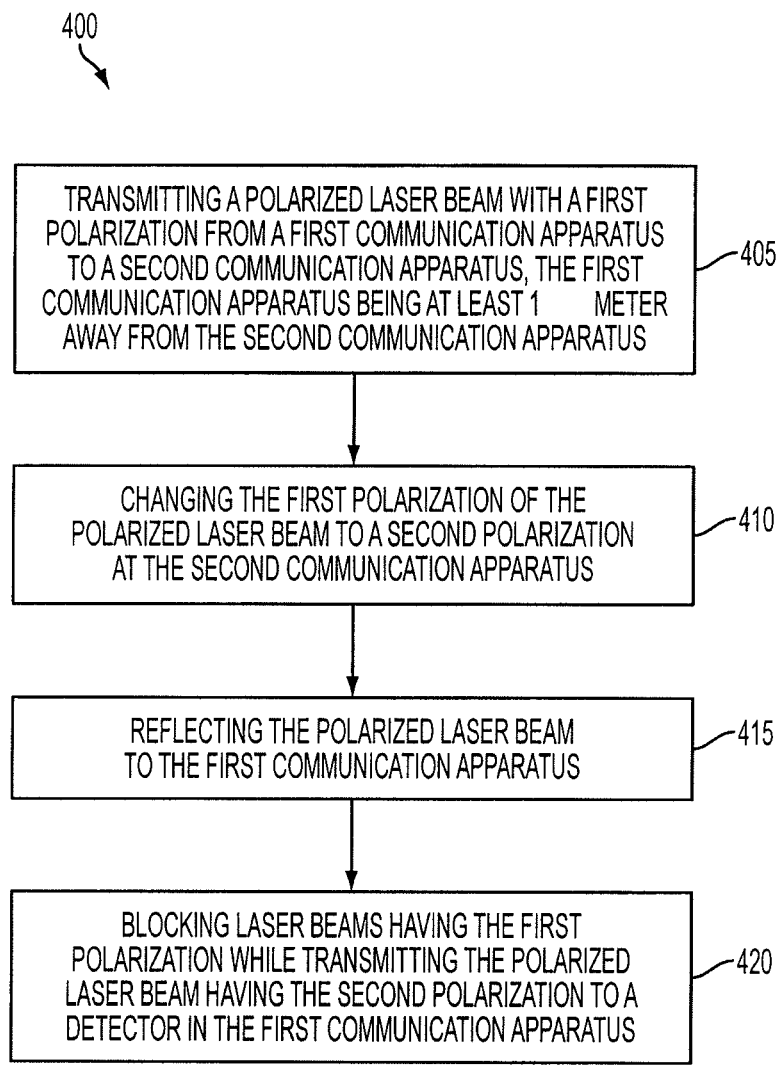
FIG. 4 is a flow chart of a method for optical communications according to an embodiment of the invention.

FIG. 3 is a block diagram of an interrogator 305 according to an embodiment of the invention. The light source 120 emits the light beam 145 having a first polarization toward the reflector apparatus 175. The light beam 145 passes through the beamsplitter 130 and through the half waveplate 125. The half waveplate 125 modifies the polarization of the light beam 125 that is emitted from the light source 120. The quarter waveplate 160 modifies the polarization of the light beam 145 to produce the light beam 150 having a second polarization. In one embodiment, the first polarization is about 90 degrees different from the second polarization. In another embodiment, the first polarization is left-hand polarized and the second polarization is right-hand polarized. The light beam 150 is transmitted to the half waveplate 125 that rotates the polarization of the light beam 150 to about 45 degrees towards the optical axis of the quarter waveplate 160. The polarization beamsplitter 130 reflects a significant portion of the light beam 150 from the reflection apparatus 175 and passes a significant portion of the reflected light from the background area 170. The light beam 150 from the reflection apparatus 175 has a different polarization than the reflected light from the background. Therefore, the beamsplitter 130 is able to reflect a significant portion of the light beams having a first polarization and pass a significant portion of the light beams having a second polarization. The detector 140 detects the light beams 150 that are reflected from the beamsplitter 130.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:
1. An optical communication system, comprising:
a light transmission unit configured to transmit a light beam;
a half waveplate configured to modify the transmitted light to have a first polarization that is at least one of linear or circularly polarized;
a beamsplitter positioned adjacent to the light transmission unit, the beamsplitter configured to pass light beams having the first polarization and reflect light beams having a third polarization;
a quarter waveplate configured to receive the light beam and to modify the light beam to have a second polarization by phase retardation or shift of 90 degrees without optical rotation such that the second polarization is circularly polarized when the first polarization is linear, and the second polarization is linear when the first polarization is circularly polarized;
a retroreflector configured to receive the light beam having the second polarization from the quarter waveplate and reflect the light beam back through the quarter waveplate so as to modify the light beam to have the third polarization, wherein the beamsplitter is configured to reflect the light beam having the third polarization;
a polarizer configured to receive the light beam having the third polarization reflected by the beamsplitter, the polarizer further configured to pass the reflected light beam having the third polarization and to block the light beam having the first polarization; and
a detector configured to detect the reflected light beam having the third polarization received from the polarizer.

2. The optical communication system of claim 1 wherein the retroreflector further comprises a modulator to modulate the light beam having the second polarization.

3. The optical communication system of claim 1 further comprising a housing having an opening, wherein the light transmission unit, the half waveplate, the beamsplitter, and the polarizer are positioned in the housing, wherein the light transmission unit is configured to transmit the light beam through the opening of the housing, and the beamsplitter is configured to receive the light beam having the third polarization through the opening of the housing.

4. An optical communication system, comprising:
   a light transmission unit configured to transmit a light beam;
   a half waveplate configured to modify the transmitted light to have a first circular polarization;
   a beamsplitter positioned adjacent to the light transmission unit, the beamsplitter configured to pass light beams having the first circular polarization;
   a quarter waveplate configured to receive the light beam and to modify the light beam to have a linear polarization by phase retardation or shift of 90 degrees without continuous optical rotation;
   a retroreflector configured to receive the light beam from the quarter waveplate and reflect the light beam back through the quarter waveplate so as to modify the light beam to have the first circular polarization, wherein the beamsplitter is configured to reflect the light beam having the first circular polarization;
   a polarizer configured to pass the reflected light beam having the first circular polarization and to block the light beam having a second circular polarization; and
   a detector configured to detect the reflected light beam having the first circular polarization received from the polarizer.

5. The optical communication system of claim 4 wherein the first circular polarization is right-hand circular polarization and the second circular polarization is left-hand circular polarization.

6. The optical communication system of claim 4 wherein the first circular polarization is left-hand circular polarization and the second circular polarization is right-hand circular polarization.

7. An interrogator comprising:
   a laser transmission unit configured to transmit a polarized laser beam having a first polarization that is at least one of linear or circularly polarized;
   a beamsplitter positioned adjacent to the light transmission unit, the beamsplitter configured to pass light beams having the first polarization and reflect light beams having a third polarization;
   a quarter waveplate optically coupled to the laser transmission unit, the quarter waveplate configured to receive the polarized light beam having the first polarization and modify the polarized light beam to have a second polarization by phase retardation or shift of 90 degrees without optical rotation such that the second polarization is circularly polarized when the first polarization is linear, and the second polarization is linear when the first polarization is circularly polarized; and
   a polarizer optically coupled to the quarter waveplate, the polarizer configured to receive a light beam having the third polarization reflected by the beamsplitter, the polarizer configured to block laser beams having the first polarization and transmit the laser beam having the third polarization to a detector.

8. The interrogator of claim 7 further comprising a half waveplate positioned adjacent to the laser transmission unit for modifying the polarized laser beam to have the first polarization.

9. The interrogator of claim 7 wherein the detector is configured to detect the reflected light beam having the third polarization received from the polarizer.

10. An optical communication system, comprising:
   a light transmission unit configured to transmit a light beam;
   a half waveplate configured to modify the transmitted light to have a first polarization that is at least one of linear or circularly polarized;
   a polarizing beamsplitter positioned adjacent to the light transmission unit, the polarizing beamsplitter configured to pass light beams having the first polarization and reflect light beams having a third polarization;
   a quarter waveplate configured to receive the light beam and to modify the light beam to have a second polarization such that the second polarization is circularly polarized when the first polarization is linear, and the second polarization is linear when the first polarization is circularly polarized;
   a retroreflector configured to receive the light beam from the quarter waveplate and reflect the light beam back through the quarter waveplate so as to modify the light beam to have a third polarization, wherein the polarizing beamsplitter is configured to reflect the light beam having the third polarization; and
   a detector configured to detect the reflected light beam having the third polarization received from the polarizer.

11. The optical communication system of claim 10 further comprising a housing having an opening, wherein the light transmission unit, the half waveplate, and the polarizing beamsplitter are positioned in the housing, and wherein the light transmission unit is configured to transmit the light beam through the opening of the housing, and the polarizing beamsplitter is configured to receive the light beam having the third polarization through the opening of the housing.

* * * * *